US009326367B2

(12) United States Patent
Zhang et al.

(10) Patent No.: US 9,326,367 B2
(45) Date of Patent: Apr. 26, 2016

(54) DEVICES FOR GAS COOLING PLASMA ARC TORCHES AND RELATED SYSTEMS AND METHODS

(71) Applicant: Hypertherm, Inc., Hanover, NH (US)

(72) Inventors: Yu Zhang, Lebanon, NH (US); Zheng Duan, Hanover, NH (US)

(73) Assignee: Hypertherm, Inc., Hanover, NH (US)

( * ) Notice: Subject to any disclaimer, the term of this patent is extended or adjusted under 35 U.S.C. 154(b) by 126 days.

(21) Appl. No.: 14/090,577

(22) Filed: Nov. 26, 2013

(65) Prior Publication Data
US 2015/0028001 A1 Jan. 29, 2015

Related U.S. Application Data

(60) Provisional application No. 61/858,235, filed on Jul. 25, 2013.

(51) Int. Cl.
| | |
|---|---|
| *B23K 10/00* | (2006.01) |
| *H05H 1/28* | (2006.01) |
| *H05H 1/34* | (2006.01) |
| *B23K 9/28* | (2006.01) |

(52) U.S. Cl.
CPC ............... *H05H 1/28* (2013.01); *B23K 9/285* (2013.01); *H05H 1/34* (2013.01); *H05H 2001/3457* (2013.01)

(58) Field of Classification Search
CPC ............. H05H 1/28; H05H 1/34; H05H 1/26; H05H 2001/3457
USPC ............... 219/121.49, 121.5, 121.51, 121.59, 219/121.52; 315/111.21; 313/231.41, 313/231.51
See application file for complete search history.

(56) References Cited

U.S. PATENT DOCUMENTS

| | | | |
|---|---|---|---|
| 4,777,343 A | * | 10/1988 | Goodwin ................. 219/121.5 |
| 5,208,448 A | | 5/1993 | Everett |
| 5,317,126 A | | 5/1994 | Couch, Jr. et al. |
| 5,726,415 A | | 3/1998 | Luo et al. |

(Continued)

FOREIGN PATENT DOCUMENTS

WO 03073800 A2 9/2003

OTHER PUBLICATIONS

Notification of Transmittal of the International Search Report and the Written Opinion of the International Searching Authority issued from the Korean Intellectual Property Office acting as the International Searching Authority for related International Application No. PCT/US2014/042475, dated Nov. 17, 2014. 15 pages.

*Primary Examiner* — Mark Paschall
(74) *Attorney, Agent, or Firm* — Proskauer Rose LLP

(57) ABSTRACT

In some aspects, nozzles for gas-cooled plasma torches can include a body having a first end and a second end that define a longitudinal axis; a plenum region substantially formed within the body that extends from the first end and is configured to receive a plasma gas flow; an exit orifice located at the second end oriented substantially coaxially with the longitudinal axis, the exit orifice fluidly connected to the plenum region; and a feature on an outer surface of the body to increase cooling by receiving a high velocity cooling gas flow flowing in a direction along a length of the body, an impingement surface of the feature to receive the cooling gas flow at a substantially perpendicular direction relative to the impingement surface and to redirect the cooling gas flow to promote cooling and uniform shield flow.

10 Claims, 8 Drawing Sheets

(56) References Cited

U.S. PATENT DOCUMENTS

| | | |
|---|---|---|
| 5,886,315 A | 3/1999 | Lu et al. |
| 5,977,510 A | 11/1999 | Lindsay |
| 6,084,199 A | 7/2000 | Lindsay et al. |
| 6,268,583 B1 * | 7/2001 | Yamaguchi et al. ..... 219/121.52 |
| 6,424,082 B1 * | 7/2002 | Hackett et al. ........... 313/231.31 |
| 8,089,025 B2 | 1/2012 | Sanders |
| 8,338,740 B2 | 12/2012 | Liebold et al. |
| 2004/0169018 A1 | 9/2004 | Brasseur et al. |
| 2010/0155373 A1 * | 6/2010 | Yamaguchi et al. ....... 219/121.5 |
| 2011/0062124 A1 | 3/2011 | Duan et al. |
| 2012/0012560 A1 | 1/2012 | Roberts et al. |
| 2012/0055906 A1 | 3/2012 | Shipulski et al. |

\* cited by examiner

DEVICES FOR GAS COOLING PLASMA ARC TORCHES AND RELATED SYSTEMS AND METHODS

RELATED APPLICATIONS

This application claims the benefit of U.S. Provisional Patent Application Ser. No. 61/858,235 filed Jul. 25, 2013, entitled "Plasma Arc Torch Nozzles, Shields and Retaining Caps," the contents of which are hereby incorporated herein by reference in their entirety.

TECHNICAL FIELD

This disclosure relates generally to thermal cutting torches (e.g., plasma arc torches), and more specifically to devices for gas cooling plasma arc torches and to related systems and methods.

BACKGROUND

Basic components of modern conventional plasma arc torches include a torch body, an electrode (e.g., cathode) mounted within the body, a nozzle (e.g., anode) with a central orifice that can produce a pilot arc to the electrode to initiate a plasma arc in a flow of a suitable gas (e.g. air, nitrogen or oxygen) and associated electrical connections and passages for cooling, and arc control fluids. Generation of the pilot arc may be by means of a high frequency, high voltage signal coupled to a DC power supply and the plasma arc torch, or any of a variety of contact starting methods. In some configurations, a shield is mounted to the torch body to prevent metal that is spattered from the workpiece (sometimes referred to as slag) during processing from accumulating on torch parts (e.g., the nozzle or the electrode). Generally, the shield includes a shield exit portion (also called a shield orifice) that permits the plasma jet to pass therethrough. The shield can be mounted co-axially with respect to the nozzle such that the plasma exit portion is aligned with the shield exit portion.

Cooling capacity has been a limitation of previous designs relating to plasma arc torches. For example, previous designs have required the use of cooling mediums other than or in addition to a gas (e.g., cooling water or liquid) for torches that operate at high (e.g., 100 or 200 Amps, or more) current levels. Most of these cooling methods can require cooling systems external to the torch (e.g., which can include water supplies, reservoirs, heat exchange equipment, supply pumps, etc.). External cooling systems can increase the associated equipment expense, can require more maintenance, be vulnerable to spills, and in some cases, can require disposal of the cooling medium. The issue of cooling the plasma arc torch is more acute for higher current systems, as higher current systems can generate more heat and have larger cooling demands. Indeed, commercially available plasma arc torch cutting systems operating at more than about 100 amperes typically utilize cooling systems using a liquid coolant (e.g., water or glycol). However, other systems are possible.

SUMMARY

In some aspects, a nozzle for a gas-cooled plasma arc torch can include a hollow generally cylindrical body having a first end and a second end that define a longitudinal axis, the second end of the body defining a nozzle exit orifice; a gas channel formed in the first end between an interior wall and an exterior wall of the cylindrical body, the gas channel directing a gas flow circumferentially about at least a portion of the body; an inlet passage formed substantially through a radial surface of the exterior wall and fluidly connected to the gas channel; and an outlet passage at least substantially aligned with the longitudinal axis and fluidly connected to the gas channel.

Embodiments can include one or more of the following features.

In some embodiments, the inlet passage can include an inlet port formed through a radial surface of the body. In some cases, the outlet passage can include an outlet port formed through a second exterior radial surface of the body between the second end of the nozzle and the inlet port.

In some embodiments, the nozzle includes a plurality of (e.g., multiple) inlet passages. In some cases, a radial angle between respective inlet passages is about 120 degrees. In some embodiments, the nozzle includes a plurality of outlet passages. In some cases, a radial angle between respective outlet passages is about 120 degrees. In some embodiments, the nozzle includes a plurality of inlet passages and a plurality of outlet passages. In some cases, the inlet passages are radially offset from the outlet passages.

In some embodiments, the circumferential gas flow along the gas channel extends about an entire circumference of the nozzle.

In some embodiments, a portion of the nozzle walls are configured to mate with an exterior surface of a swirl ring. In some cases, the swirl ring forms a portion of the gas channel.

In some aspects, a nozzle for a gas-cooled plasma arc torch can include a hollow generally cylindrical body having a first end and a second end that define a longitudinal axis, the second end of the body defining a nozzle exit orifice; a plenum region defined within the body and directing a plasma gas; a cooling gas channel formed in the first end between an interior wall and an exterior wall of the cylindrical body, the cooling gas channel isolating a cooling gas from the plasma gas; a substantially radially oriented inlet passage fluidly connected to the gas channel; and a substantially longitudinally oriented outlet passage fluidly connected to the gas channel.

Embodiments can include one or more of the following features.

In some embodiments, the radially oriented inlet passage also includes an inlet port formed through a radial surface of the body. In some embodiments, the longitudinally oriented outlet passages also include an outlet port formed through a radial surface of the body between the second end of the nozzle and the inlet port. In some embodiments, the nozzle includes a plurality of radially oriented inlet passages. In some cases, a radial angle between respective inlet passages is about 120 degrees. In some embodiments, the nozzle also includes a plurality of outlet passages. In some cases, a radial angle between respective outlet passages is about 120 degrees. In some embodiments, the nozzle includes a plurality of inlet passages and a plurality of outlet passages. In some cases, the inlet passages are radially offset from the outlet passages.

In some embodiments, the circumferential gas flow along the gas channel extends about an entire circumference of the nozzle. In some embodiments, a portion of the nozzle walls are configured to mate with an exterior surface of a swirl ring. For example, the swirl ring can form a portion of the gas channel.

In some embodiments, the plasma gas and the cooling gas combine at the exit orifice of the nozzle.

In some aspects, a method for cooling a nozzle for a plasma arc torch can include providing the nozzle having a hollow body with a first end and a second end, the second end of the body defining a nozzle exit orifice, a gas channel formed in the first end of the body, a substantially radially oriented inlet passage fluidly connected to the gas channel, and a substantially longitudinally oriented outlet passage fluidly connected to the gas channel; flowing the cooling gas through the inlet passage into the gas channel; directing the cooling gas along the gas channel; and discharging the cooling gas from the gas channel to the outlet passage.

In some aspects, a nozzle for a gas-cooled plasma arc torch can include a body having a first end and a second end that define a longitudinal axis; a plenum region substantially formed within the body, the plenum region extending from the first end of the body and configured to receive a plasma gas flow; an exit orifice located at the second end of the body and oriented substantially coaxially with the longitudinal axis, the exit orifice fluidly connected to the plenum region; and a feature on an outer surface of the body configured to increase cooling by receiving a cooling gas flow flowing at high velocity generally in a direction of the longitudinal axis along a length of the body, an impingement surface of the feature configured to receive the cooling gas flow at a substantially perpendicular direction relative to the impingement surface and to redirect the cooling gas flow to promote cooling and uniform shield flow.

Embodiments can include one or more of the following features.

In some embodiments, the feature is disposed about a circumference of the outer surface of the nozzle body.

In some embodiments, the substantially perpendicular direction can be between about 45 degrees and 90 degrees relative to the impingement surface.

In some embodiments, a cross section of the impingement surface of the feature includes a substantially planar surface that is arranged substantially perpendicularly to the cooling gas flow. In some embodiments, the impingement surface of the feature includes a substantially conical surface. In some embodiments, the feature is positioned on the nozzle adjacent a corresponding feature of a shield component. In some cases, the corresponding feature is a mixing chamber.

In some embodiments, the high velocity is at least 300 meters per second.

In some embodiments, the feature includes at least a portion of a chamber of sufficient size to increase a flow uniformity of the cooling gas by performing as a buffering chamber to reduce cooling gas flow transients. In some cases, the chamber extends about a circumference of the outer surface of the nozzle.

In some embodiments, the nozzle includes a sharp corner adjacent the impingement surface to generate turbulence in the cooling gas flow.

In some aspects, a nozzle cooling system for a plasma arc torch can include a nozzle having a body with a first end and a second end that define a longitudinal axis, a plenum region substantially formed within the body, the plenum region extending from the first end of the body and configured to receive a plasma gas flow, an exit orifice located at the second end of the body and oriented substantially coaxially with the longitudinal axis, the exit orifice fluidly connected to the plenum region, and a feature on an outer surface of the body configured to increase cooling by receiving a cooling gas flow flowing at high velocity generally in a direction of the longitudinal axis along a length of the body, an impingement surface of the feature configured to receive the cooling gas flow at a substantially perpendicular direction relative to the impingement surface and to redirect the cooling gas flow to promote cooling and uniform shield flow; and a nozzle retaining cap comprising a generally cylindrical body and a securing flange, the securing flange of the retaining cap including a plurality of shield gas supply ports angled generally along the longitudinal axis of the nozzle at an angle that is substantially perpendicular to the impingement surface of the feature of the nozzle.

Embodiments can include one or more of the following features.

In some embodiments, the nozzle retaining cap can include about 10 shield gas supply ports.

In some aspects, a nozzle-shield cooling system can include a nozzle having a body with a first end and a second end that define a longitudinal axis; a plenum region substantially formed within the body, the plenum region extending from the first end of the body and configured to receive a plasma gas flow; an exit orifice located at the second end of the body and oriented substantially coaxially with the longitudinal axis, the exit orifice fluidly connected to the plenum region; and a feature on an outer surface of the body configured to increase cooling by receiving a cooling gas flow flowing at high velocity generally in a direction of the longitudinal axis along a length of the body, an impingement surface of the feature configured to receive the cooling gas flow at a substantially perpendicular direction relative to the impingement surface and to redirect the cooling gas flow to promote cooling and uniform shield flow; and a shield for the plasma arc torch including a generally conical body and an end face having a shield exit orifice, an interior surface of the shield defining a mixing chamber at a location corresponding to the impingement feature of the nozzle when assembled together, the mixing chamber having an inlet edge positioned to direct the cooling gas from the impingement feature into the mixing chamber.

Embodiments can include one or more of the following features.

In some embodiments, the mixing chamber and inlet edge extend about a circumference of the interior surface of the shield. In some embodiments, a profile of the inlet edge is an acute angle. In some embodiments, the inlet edge extends toward the first end of the nozzle body. The inlet edge can also extend toward the second end of the nozzle body.

In some embodiments, the shield has at least two inlet edge features.

In some embodiments, the mixing chamber has a bulbous cross section. In some embodiments, the mixing chamber is of sufficient volume to increase a flow uniformity of the cooling gas by performing as a buffering chamber to reduce cooling gas flow transients.

In some aspects, a shield for an air-cooled plasma arc torch can include a body having a proximal end configured to mate with a torch body of the plasma arc torch and a distal end; an exit orifice formed in the distal end of the body; and an interior of the shield defining a shield flow surface that forms a portion of a shield gas flow channel, the shield gas flow channel directing a flow of shield gas along the interior shield flow surface in a flow direction from the proximal end to the exit orifice at the distal end of the body, the interior of the shield also defining a flow feature disposed on the interior shield flow surface, the flow feature formed circumferentially about an interior of the body between the proximal end and the exit orifice, the flow feature configured to reverse the flow direction of the shield gas flow within the shield gas flow channel.

Embodiments can include one or more of the following features.

In some embodiments, the interior shield flow surface includes a mixing chamber formed circumferentially about the body at a portion of the shield gas flow channel adjacent an impingement feature of a corresponding nozzle, the mixing chamber includes an inlet edge positioned to direct the shield gas into the mixing chamber. In some cases, the flow feature also defines a recombination region, the recombination region between the exit orifice and the mixing chamber.

In some embodiments, the flow feature defines a recombination region, the recombination region between a set of shield vent ports and the exit orifice.

In some embodiments, the flow feature can include a protuberance and a recess that cooperate to reverse the flow direction. In some cases, the protuberance is adjacent the recess. In some embodiments, the flow feature includes a protuberance, such that the protuberance is a ridge that extends around a circumference of the interior shield flow surface. In some embodiments, the flow feature includes a recess, such that the recess is a groove that extends around a circumference of the interior shield flow surface. In some cases, the flow feature includes a protuberance, such that the protuberance is between the recess and the exit orifice. The flow feature can be disposed on a conical portion of the shield body. The flow feature can be disposed on an end face of the distal end of the shield body. The flow feature can include a protuberance, such that the protuberance is disposed at a location on the interior shield flow surface that corresponds to a complementary feature of an adjacent torch nozzle when the shield is attached to the plasma arc torch. For example, the complementary feature of the nozzle can be a ridge.

In some embodiments, when assembled, a cross section of the protuberance and the complementary feature of the nozzle can both be parallel to a longitudinal axis of a torch body of the plasma arc torch. In some embodiments, the protuberance and the complementary feature of the nozzle form a tortured flow path.

In some aspects, a nozzle for an air-cooled plasma arc torch can include a body having a proximal end configured to mate with a torch body of the plasma arc torch and a distal end; an orifice formed in the distal end of the body; and an exterior of the nozzle comprising a nozzle flow surface that forms a portion of a shield gas flow channel, the shield gas flow channel directing a flow of shield gas along the exterior nozzle flow surface in a flow direction from the proximal end to the orifice at the distal end of the body, the exterior of the nozzle also having a flow feature disposed on the exterior nozzle flow surface, the flow feature formed circumferentially about an exterior of the body between the proximal end and the orifice, the flow feature configured to reverse the flow direction of the shield gas flow within the shield gas flow channel.

Embodiments can include one or more of the following features.

In some embodiments, the nozzle includes a feature on the exterior nozzle flow surface of the nozzle body configured to increase cooling of the body by receiving at least a portion of the shield gas flow flowing at high velocity generally in a direction of a longitudinal axis of the nozzle body and along a length of the body, an impingement surface of the feature configured to receive the at least a portion of the cooling gas flow at a substantially perpendicular direction relative to the impingement surface and to redirect the cooling gas flow to promote cooling and uniform shield flow.

In some embodiments, the exterior nozzle flow surface includes a mixing chamber formed circumferentially about the body at a portion of the shield gas flow channel that is adjacent the impingement feature.

In some embodiments, the flow feature can include a protuberance and a recess that cooperate to reverse the flow direction. In some cases, the protuberance is adjacent the recess. In some embodiments, the flow feature includes a protuberance, such that the protuberance is a ridge that extends around a circumference of the exterior nozzle flow surface.

In some embodiments, the flow feature can include a recess, such that the recess is a groove that extends around a circumference of the exterior nozzle flow surface. In some embodiments, the flow feature can include a protuberance, such that the protuberance is between the recess and the orifice. The flow feature can be disposed on a conical portion of the nozzle body. The flow feature can be disposed on an end face of the distal end of the nozzle body. In some embodiments, the flow feature can include a protuberance, such that the protuberance is disposed at a location on the exterior nozzle flow surface that corresponds to a complementary feature of an adjacent torch shield when the nozzle is attached to the plasma arc torch. In some cases, the complementary feature of the shield can be a ridge.

In some aspects, a consumable set for an air-cooled plasma arc torch system can include a shield including a shield body having a proximal end configured to mate with a torch body of the plasma arc torch and a distal end; an exit orifice formed in the distal end of the body; and an interior of the shield having a shield flow surface that forms a portion of a shield gas flow channel, the shield gas flow channel directing a flow of shield gas along the interior shield flow surface in a flow direction from the proximal end to the exit orifice at the distal end of the body, the interior of the shield also having a flow feature disposed on the interior shield flow surface, the flow feature formed circumferentially about an interior of the body between the proximal end and the exit orifice, the flow feature configured to reverse the flow direction of the shield gas flow within the shield gas flow channel; and a nozzle formed of an electrically conductive material including a nozzle body having a first end and a second end that define a longitudinal axis; a plenum region substantially formed within the nozzle body, the plenum region extending from the first end of the nozzle body and configured to receive a plasma gas flow, the plenum region fluidly connected to the exit orifice; a feature on an outer surface of the nozzle body configured to increase nozzle cooling by receiving a cooling gas flow flowing at high velocity generally in a direction of the longitudinal axis along a length of the nozzle body, an impingement surface of the feature configured to receive at least a portion of the cooling gas flow at a substantially perpendicular direction relative to the impingement surface and to redirect the cooling gas flow to promote cooling and uniform shield flow, such that at least a portion of the cooling gas flow from the impingement surface exits the torch at the orifice.

Embodiments can include one or more of the following features.

In some embodiments, the interior shield flow surface further can include a mixing chamber formed circumferentially about the shield body at a portion of the shield gas flow channel adjacent the impingement feature.

In some aspects, a method for cooling a nozzle of an air-cooled plasma arc torch can include supplying a shield gas at a substantially perpendicular angle to an exterior feature of the nozzle; redirecting the shield gas from the exterior feature of the nozzle to a mixing chamber adjacent the feature; and flowing the shield gas from the mixing chamber along a shield gas flow channel to an exit orifice of the shield, the shield gas flow channel at least partially defined by an exterior surface of the nozzle.

Embodiments can include one or more of the following features.

In some embodiments, the method can also include flowing the shield gas from the mixing chamber through a recombination region disposed between the nozzle and the shield to produce a substantially uniform shield gas flow at the exit orifice, the recombination region comprising at least one flow-redirecting member. In some cases, the recombination region can be downstream of the mixing chamber and include a baffle on an interior surface of the shield and a baffle on an exterior surface of the nozzle. In some cases, the shield baffle and the nozzle baffle are adjacent each other when the shield and the nozzle are assembled to the torch.

In some embodiments, at least a portion of the mixing chamber can be disposed on the exterior surface of the nozzle. In some embodiments, at least a portion of the mixing chamber can be disposed on an interior surface of an adjacent shield. In some embodiments, at least a portion of the mixing chamber can be disposed on the exterior surface of the nozzle and at least a portion of the mixing chamber can be disposed on an interior surface of an adjacent shield.

In some aspects, a method for providing a uniform shield gas flow for an air-cooled plasma arc torch can include supplying a shield gas to a shield gas flow channel defined by an exterior surface of a nozzle and an interior surface of a shield; flowing the shield gas along the shield gas flow channel; reversing the flow of the shield gas along the shield gas flow channel using a recombination region, the recombination region comprising at least one flow reversing member; and flowing the shield gas from the mixing region to an exit orifice of the shield, thereby producing a substantially uniform shield gas flow at the exit orifice.

In some aspects, a nozzle for a gas-cooled plasma arc torch can include a nozzle body having a proximal end and a distal end that define a nozzle body length and a longitudinal axis, the body including; an exit orifice defined by the distal end of the nozzle body; a plenum within the nozzle body, the plenum extending from the proximal end of the nozzle body to a plenum floor, a distance from the plenum floor to the distal end defining a plenum floor thickness, and a distance from the plenum floor to the proximal end of the nozzle body defining a proximal end height; and a bore extending from the plenum floor to the exit orifice, the bore having a bore length and a bore width, wherein the nozzle body has a nozzle width in a direction transverse to the longitudinal axis, wherein the nozzle body length is greater than the nozzle width, and wherein a ratio of the proximal end height to the plenum floor thickness is less than 2.0.

Embodiments can include one or more of the following features.

In some embodiments, the nozzle can also include a body flange at the proximal end of the nozzle body, an overall length of the nozzle defined by a distance from a proximal end of the nozzle body flange to an end face at the distal end of the nozzle, such that the overall length of the nozzle is greater than the nozzle body length. In some cases, the body flange extends about 0.05 to about 0.5 inches above the nozzle plenum. In some cases, the proximal end height includes the body flange.

The length of the bore corresponds to the plenum floor thickness. The bore can include a chamfer or a counter bore. The width of the bore can vary along its length. The bore can have a chamfer or a counter bore at each end of its length.

In some embodiments, the exit orifice can be at an end face of the nozzle.

In some embodiments, a ratio of the length of the bore to the nozzle body length can be greater than about 0.32.

In some embodiments, a side wall thickness of the plenum can be between an inside diameter of the plenum and an outer diameter of the plenum, and the ratio of the plenum side wall thickness to the width of the nozzle body can be about 0.15 to about 0.19. In some embodiments, a side wall of the plenum can include one or more cooling gas passages.

In some embodiments, the nozzle can be sized to operate in the plasma arc torch at a current flow of at least 100 amps. In some embodiments, the nozzle can operate at a current to nozzle body length ratio of greater than 170 amps per inch.

In some embodiments, the ratio of the proximal end height to the plenum floor thickness can be less than about 1.4.

In some aspects, a nozzle for an air-cooled plasma arc torch configured to operate above 100 amps can include a nozzle body having a distal portion defining a conduit substantially aligned with a longitudinal axis of the nozzle body, the conduit having a conduit length and shaped to direct a plasma gas flow; and a proximal portion coupled to the distal portion and having a proximal portion length, the proximal portion defining a plenum fluidly connected to the conduit, wherein a ratio of a length of the proximal portion to the conduit length can be less than about 2.0, and wherein the nozzle can be configured to permit operation at a current to nozzle body length ratio of greater than about 170 amps/inch.

Embodiments can include one or more of the following features.

In some embodiments, the nozzle can include a body flange at a proximal end of the proximal portion of the nozzle body, an overall length of the nozzle defined by a distance from a proximal end of the nozzle body flange to an end face at the distal end of the nozzle, such that the overall length of the nozzle is greater the nozzle body length. In some embodiments, the body flange of the nozzle can include a flow channel.

In some embodiments, the conduit length can correspond to a plenum floor thickness. In some embodiments, the conduit can include a chamfer or a counter bore. In some embodiments, a width of the conduit can vary along the conduit length. In some embodiments, the conduit can have a chamfer or a counter bore at each end of its length.

In some embodiments, a side wall thickness of the plenum can be between an inside diameter of the plenum and an outer diameter of the plenum, and the ratio of the plenum side wall thickness to the width of the nozzle body can be about 0.15 to about 0.19. In some embodiments, a side wall of the plenum can include one or more cooling gas passages.

In some embodiments, the cooling gas passages can be sized to permit the nozzle to operate in the plasma arc torch at a current flow of at least 100 amps. In some embodiments, the cooling gas passages can be sized to permit operation of the nozzle at a current to nozzle body length ratio of greater than 170 amps per inch.

In some embodiments, the ratio of the length of the proximal portion to the conduit length can be less than about 1.4.

Embodiments described herein can have one or more of the following advantages.

In some aspects, consumable components (e.g., nozzles) as described herein having a gas cooling channel formed between an inner (e.g., interior) wall and an outer (e.g., exterior) wall can have greater cooling capabilities than some other consumable components that do not have similar gas channels. The increased cooling capabilities result in part because additional cooling gas contact surface area is created within the nozzle through which heat can transfer and be carried away by the cooling gas. Increased cooling capabilities can result in better cutting performance, for example, by helping to create more stable plasma arcs and longer usable consumable life. Longer usable consumable life can lead to fewer consumable replacements needed, which can result in reduced costs and system downtime.

Further, forming the gas cooling channel within an outer wall of the nozzle can provide for better separation (e.g., isolation) of the gas cooling channel from the plasma gas flow path, which can result in increased cooling capabilities without substantially interfering with delivery and/or control of the plasma gas.

Additionally, gas cooling channels having one or more horizontal (i.e., substantially perpendicular to a longitudinal axis of the nozzle) inlets and one or more vertical (i.e., substantially longitudinally) outlets which may be circumferentially offset from the horizontal inlets, can help to provide impinging gas flows onto different surfaces of the nozzle. The impinging flow can help to create turbulent flows for additional increased cooling.

In some aspects, nozzles described herein having a feature arranged along its outer surface that defines an impingement surface to receive a cooling gas flow (e.g., a high speed cooling gas flow) can have increased nozzle cooling capabilities relative to some other conventional nozzles. As discussed herein, the impingement surface can be angled relative to one or more other outer surfaces of the nozzle so that the cooling gas flow contacts (i.e., impinges) the impingement surface substantially perpendicularly relative to the impingement surface, which can result in increased cooling capabilities. For example, as discussed herein, the angled impingement surface is typically angled to be arranged substantially perpendicularly to an angled cooling gas flow channel defined within a nozzle retaining cap that provides a cooling gas flow.

Further, the arrangement of the angled impingement surface within a mixing channel can help to generate high velocity gas flow mixing, for example, in part due to the substantially perpendicular impingement of the gas flow onto the impingement surface, which can increase cooling capabilities relative to some other conventional nozzles without such features. In some cases, the feature and the impingement surface help to create a turbulent flow within the mixing channel which further aids cooling. Additionally, in some cases, the mixing channel can help to mix and distribute (e.g., evenly distribute) the flow of the cooling shield gas around the nozzle so that it can be delivered more evenly. More evenly delivered shield gas can create a more stable plasma arc, which can result in improved cut speed and consistency.

In some aspects, alternatively or additionally, features of the nozzle can work in combination with corresponding features (e.g., grooves or flanges) formed on other consumable components, such as a shield, to alter (e.g., disturb, perturb, and/or partially block, redirect, or redistribute) the flow of shield gas flowing between the nozzle and the shield. For example, as discussed herein, some nozzles can include a recess in which a flange of a shield can be partially disposed during use. The configuration of the flange disposed within a recess can cause the flowing shield gas to be temporarily redirected (e.g., directed away from and then back towards) the distal end of the torch. Such redirection can help to mix and distribute the shield gas flow annularly around the shield exit orifice so that the distribution of shield gas exiting the torch can be more evenly distributed than in some other conventional torch systems. More evenly distributed shield gas can be useful in helping to create a more stable plasma arc by reducing or limiting inconsistently varying gas flows around the plasma arc. Similarly, other features described herein, such as the complementary mixing channel formed by features and surfaces of the nozzle and/or shield (discussed below with reference to FIG. 3) can also help to receive gas flow delivered from multiple discrete channels and distribute the gas flow circumferentially around the nozzle to help create a more evenly distributed gas flow and a more uniform plasma arc.

In some aspects, nozzles as described herein that are designed, proportioned, and constructed to be shorter (i.e., longitudinally shorter proximal end height), wider (i.e., having a thicker nozzle tip (e.g., a wider or larger end face) and/or thicker plenum side walls), and/or have a longer bore (i.e., a thicker distal region) can produce greater cooling effects relative to some other conventional nozzles that lack such modified features. In some cases, it is expected that these proportions result in a nozzle having increased tip mass concentrated at the distal region (e.g., increased tip mass to volume ratios relative to the rest of the nozzle), which can result in increased cooling capacity. In particular, increased material mass and volume located at the distal tip of the nozzle, especially increased material positioned radially surrounding the exit orifice can provide greater heat transfer paths through which heat can travel outwardly within the nozzle and proximally away from the torch tip.

DETAILED DESCRIPTION

In some aspects, nozzles can include or define a feature arranged along an outer surface that defines an impingement surface to receive a cooling gas flow (e.g., a high speed cooling gas flow) from one or more torch component to increase nozzle cooling capabilities relative to some other conventional nozzles.

Figure 1:
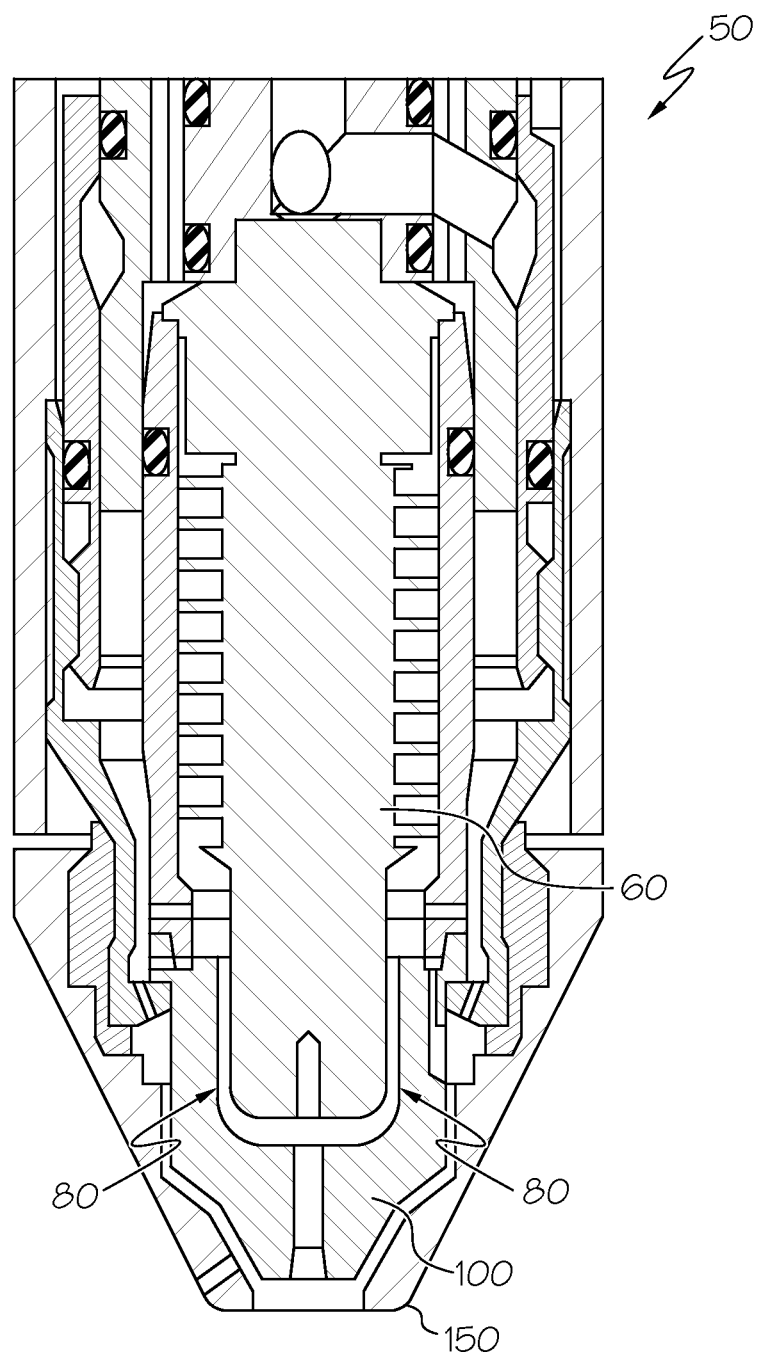
FIG. 1 is a cross sectional view of an example plasma arc torch defining various gas flow channels used to deliver shield or cooling gas to the torch tip.

FIG. 1 illustrates an example plasma torch 50 that can be used with the various aspects and embodiments of the plasma arc torch cooling systems, devices, and methods described herein. Referring to FIG. 1, the plasma torch 50 can include an electrode 60, a nozzle 100, and a shield 150. The torch 50 can be in electrical communication (e.g., using a current-carrying cable (not shown)) with a power supply (not shown) and receive electrical current from the power supply. The electrical current received from the power supply is transferred, through a current path, to the electrode 60 toward the nozzle 100.

During use, gas (e.g., plasma gas) is directed into a plenum region 80 defined between the electrode 60 and the nozzle 100. The plasma gas can be accelerated (e.g., the plasma gas can be heated, which reduces density of the gas as the plasma is formed, which increases its volume and velocity) within the plasma plenum 80 to generate a plasma stream via a plasma arc created between the electrode 60 and the nozzle 100.

Experimental studies have indicated that nozzle temperature during the use (e.g., and the extent to which a nozzle can be kept cool) can have a significant impact on electrode life. In particular, as a result of the relatively high operating temperature in high current air-cooled plasma arc cutting that can significantly increase the material wear and erosion, electrode and nozzle life can be low relative to lower current air-cooled plasma arc cutting systems. Accordingly, increased cooling can be a useful technique in extending or prolonging the usable life span of an electrode and/or an air-cooled nozzle. Cooling can be achieved by directing gas (e.g., air, nitrogen or oxygen) through the electrode and/or nozzle surfaces. The flow of gas through these elements (e.g., electrode or nozzle) can be directed along internal and/or external surfaces. In some cases, the plasma arc torch can be an air cooled torch that is cooled by directing one or more high speed cooling gas flows (e.g., air at about 20 standard cubic feet per hour (scfh) to about 250 scfh) through various channels defined within the torch tip.

Some embodiments described herein can increase (e.g., significantly enhance) the cooling of the torch consumables (i.e., even without the use of cooling liquids), such as a torch nozzle, thereby improving the usable life span. In some embodiments, nozzle cooling can be accomplished by utilizing shield flow and allowing the shield flow to directly flow towards one or more surfaces of the nozzle. For example, in some embodiments, the shield flow can be directed such that it impinges (e.g., flows perpendicularly with respect to) a nozzle surface.

In some aspects, certain consumable components used within the torch (e.g., the nozzle) can include one or more of various features or elements, such as cooling flow channels, to help increase the cooling capabilities, and therefore increase the performance and usable life, of the nozzle.

Figure 2:
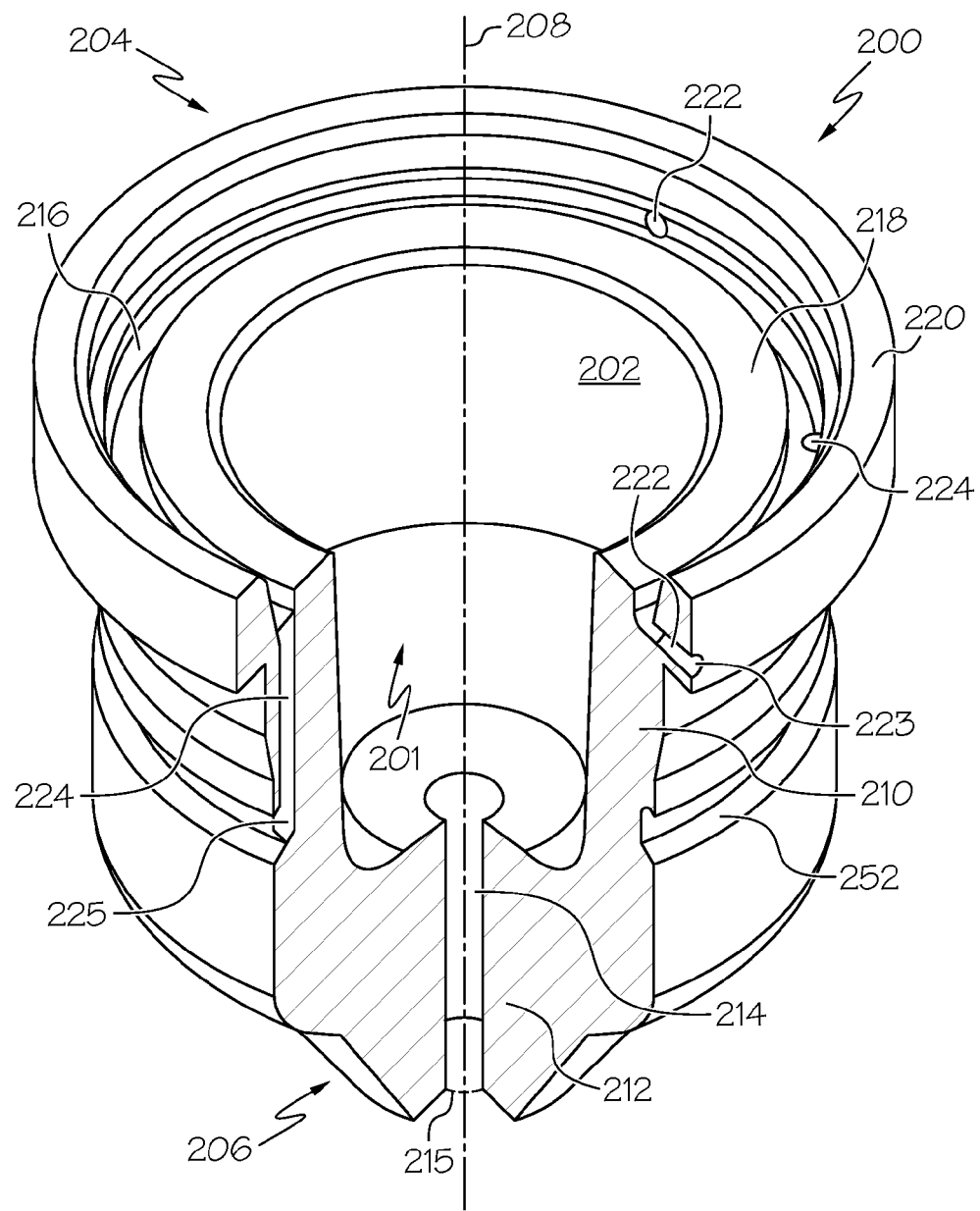
FIG. 2 is a sectioned view of an example nozzle for a plasma arc torch that includes a gas channel defined between an interior wall and an exterior wall for directing gas flow circumferentially around the body of the nozzle.

For example, referring to FIG. 2, in some aspects, a nozzle 200 can be formed from a body 202. In some embodiments, the body 202 is formed of a metal material, such as copper. As illustrated, the body 202 can be in the form of a hollow substantially cylindrical body that has a first end 204 and a second end 206 that define a longitudinal axis 208. The hollow body defines a hollow plenum region 201 configured to receive and accommodate an electrode and to direct a plasma gas between the electrode and the nozzle. The first end 204 is typically formed and configured to mate with one or more features or components of the torch. For example, in some embodiments, the nozzle can be configured to mate against a swirl ring or a retaining cap arranged within the torch. The cylindrical body also includes a generally annularly formed cylindrical wall (e.g., a plenum side wall) 210 that extends upward from a base structure (e.g., a plenum floor) 212 defined at the second end 206. The second end 206 typically defines a generally cylindrical bore (e.g., a flow conduit) 214 formed generally axially through the plenum floor. During use, plasma gas passes through the bore 214 and out of the nozzle through an exit orifice 215. The nozzle exit orifice 215 is defined at the distal end of the bore 214 along a nozzle end face formed along the second end 206.

For cooling, as well as flow distribution, a gas channel (e.g., a cooling gas flow channel) 216 can be formed at the first end 204 within a portion of the body, such as the plenum side wall, in particular, between an interior wall 218 and an exterior wall 220 to direct gas flow around the cylindrical body. For example, the gas channel 216 can be a substantially annular (e.g., circular) channel disposed in-between the interior wall 218 and exterior wall 220 to direct the gas flow circumferentially about at least a portion of the body. As discussed above, in some cases, the interior wall 218 and/or the exterior wall 220 can be configured to interface and mate with other components, such as a swirl ring, disposed within the torch to properly position and mount the nozzle or to direct gas flow to or within the flow channel. Therefore, in some cases, the swirl ring can be configured to form a portion (e.g., an upper portion) of the gas channel 216 along with the interior wall and exterior wall, essentially forming a flow conduit about the nozzle.

The configuration of the nozzle walls relative to the other components within the torch typically helps to separate and seal the flow channel from some of the other gas channels within the torch. For example, the nozzle is typically configured to isolate the shield/cooling gas flowing within the flow channel from plasma gas flowing within the plenum region. However, the plasma gas and the shield/cooling gases typically combine when they exit the torch (i.e., at the exit orifice of the nozzle).

The nozzle 200 includes one or more inlet passages 222 and one or more outlet passages 224 fluidly connected to the gas channel 216 to provide gas to and from the gas channel. The inlet passages and the outlet passages can be in the form of any of various structurally suitable features configured to contain and deliver gas to and from the gas channel. For example, the passages can be a hole, a channel, a tube, a conduit, a duct, or similar features arranged in or on the nozzle body. As discussed below, the passages can also include one or more ports (e.g., openings) formed along different surfaces of the nozzle through which gas can enter and exit the nozzle body to be delivered to and from the gas channel.

The inlet passages are typically formed substantially perpendicularly relative to at least one surface of the gas flow channel so that the gas that is expelled from the inlet passage into the flow channel impinges the nozzle surfaces within the channel to generate turbulent flow within the flow channel. Such impinging and turbulent flows generated therein are expected to increase nozzle cooling performance. To achieve this arrangement of the inlet passage relative to the flow channel, many different configurations are possible. For example, as illustrated, the inlet passages 222 can be formed through the exterior wall 220 and, when installed in the torch, can be in fluid communication with the shield gas supply of the torch. As illustrated, the inlet passages 222 can be arranged horizontally (i.e., horizontally relative to a torch that is positioned so that its longitudinal axis is vertical) so that gas entering the flow channel can strike an inner wall on an opposing surface of the flow channel (e.g., an outer surface of the interior wall 218). In some examples, the term opposing surface refers to a region of the flow channel that is generally across from the inlet passage with respect to a central region of the flow channel. In some embodiments, the inlet passages 222 can be arranged radially in the nozzle (i.e., extending inwardly towards its central, longitudinal axis 208).

The nozzle can include multiple inlet passages 222, for example, three inlet passages 222 in the embodiment illustrated in FIG. 2. As shown, in some embodiments, the inlet passages 222 can be arranged substantially uniformly (e.g., evenly separated) around the gas channel 216. For example, when three inlet passages are included, they can be separated from one another by about 120 degrees. In some cases, a more uniform distribution of inlet passages 222 can create a more even cooling gas flow into the gas channel 216.

In some embodiments, one or more inlet passages include an inlet port defined along a radial surface of the body that exposes the inlet passage to the environment surrounding the nozzle. During use, gas (e.g., shield gas or cooling gas) can enter the inlet passage through the inlet port and travel on to the gas channel. For example, as illustrated, an inlet port 223 can be in the form of hole defined along an outer surface of the exterior wall 220 of the nozzle.

The outlet passages 224 are typically formed at least partially through the plenum side wall 210 to deliver gas flow away from the gas channel. In some cases, arranging the outlet passages 224 through the plenum side wall 210 can also help cool the nozzle by creating additional heat transfer surface area within the plenum side wall. As illustrated, the outlet passage 224 can be formed longitudinally (e.g., at least substantially aligned with (e.g., substantially parallel to) the longitudinal axis 208).

The outlet passages are also typically formed substantially perpendicularly relative to at least one exterior surface of the nozzle (or another consumable component) so that the gas that is expelled from the outlet passage impinges against the exterior nozzle surfaces to further cool the nozzle. In some embodiments, outlet passages 224 can be formed within (e.g., longitudinally within) the plenum side wall 210 so that it is proximate to a recess or flange defined along the outer surface of the nozzle against which gas from the flow channel can contact (e.g., impinge) for better cooling. For example, as illustrated, the outlet passages 224 can be arranged vertically (e.g., substantially longitudinally) so that gas exiting the flow channel can strike an outer surface of the nozzle (e.g., a flow impingement surface) 252. That is, in some embodiments, the outlet passages 224 can be arranged substantially parallel to the longitudinal axis (e.g., be longitudinally oriented).

The nozzle typically includes multiple outlet passages 224, for example, three outlet passages in the embodiment illustrated in FIG. 2. As shown, in some embodiments, the outlet passages 224 can be arranged substantially uniformly around the gas channel 216. For example, when three outlet passages are included, they can be separated from one another by about 120 degrees. In some cases, a more uniform distribution of outlet passages 224 can create a more even flow of gas from the gas channel 216. This can be achieved by using additional outlet passages, e.g, four (or more) outlet passages oriented at 90 degrees from each other (not shown).

In some embodiments, the outlet passage includes an outlet port formed through a radial and/or an axial surface of the body between the second end (e.g., distal end) 206 of the nozzle and the inlet port, where the inlet port connects the inlet channel to the environment surrounding the nozzle and the outlet port similarly connects the outlet channel to the environment surrounding the nozzle. For example, gas can flow from the gas channel 216, into the outlet passage 224 formed within the plenum side wall, and out of the plenum side wall through an outlet port 225 defined within an outer surface of the plenum side wall.

Figure 7:
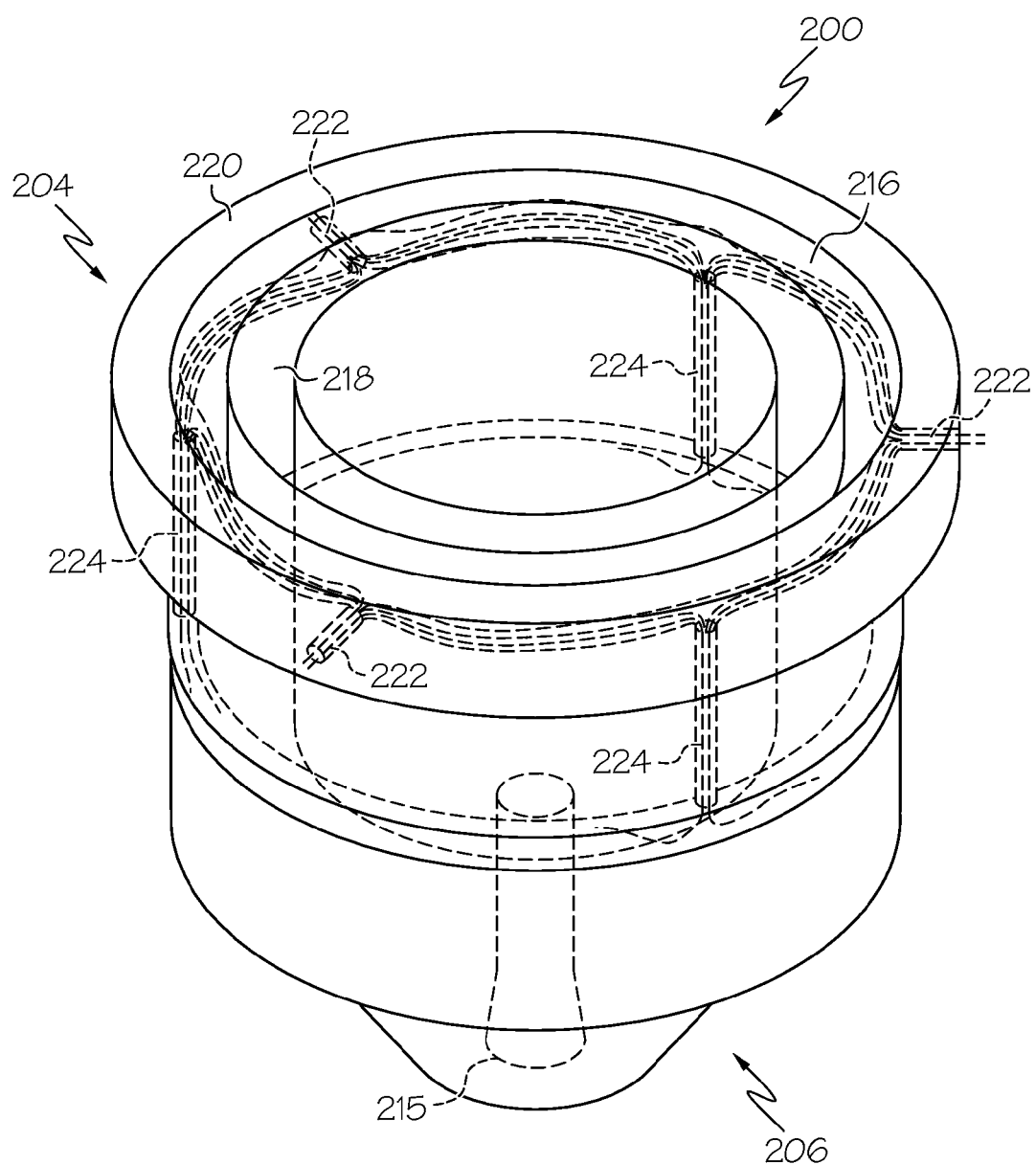
FIG. 7 is a simulated gas flow model depicting gas flow into and out of the gas channel of FIG. 2.

In some embodiments, the inlet passages 222 and the outlet passages 224 are offset (e.g., radially offset) from one another around the flow channel. For example, the inlet passages and the outlet passages can be substantially evenly, circumferentially offset from one another. That is, in some cases, one or more of the outlet passages 224 can be arranged between (e.g., equidistantly between) two of the inlet passages 222 (e.g., at 60 degree intervals in embodiments having three inlet passages and three outlet passages). Briefly referring to FIG. 7, which illustrates a simulated gas flow through the inlet passages 222, the gas channel 216, and onto the outlet passages 224, such an arrangement can increase exposure between the fluid and nozzle, and help increase fluid mixing within the gas channel 216 by providing a longer distance that the gas typically travels within the gas channel between an inlet passage and an adjacent outlet passage. Based at least in part on the increased mixing, the flow can be directed so that gas in the flow channel can flow circumferentially around the body. In some cases, the flow can be directed circumferentially all of the way around (e.g., at least 360 degrees around) the flow channel. Also illustrated in FIG. 7, the flow velocities through the inlet passages 222 and the outlet passages 224 are typically higher than the gas flow elsewhere around the gas channel 216. Further, the increased flow velocities through the inlet passages 222 can help to create the turbulent gas flow and cooling as air exits the inlet passage 222 and impinges upon an inner surface of the gas channel 216.

In some embodiments, the cooling gas passageways (e.g., the inlet passages 222 and primarily the outlet passages 224) are sized and configured to permit the nozzle to operate in the plasma arc torch at a current flow of at least 75 amps (e.g., at least 100 amps). Additionally, in some embodiments, the cooling gas passageways are sized and configured to permit operation of the nozzle at a current to nozzle body length ratio of greater than 150 amps per inch (e.g., greater than 170 amps per inch).

Such current flow can help to cut materials at faster cutting speeds. For example, in some cases, the torch can cut half inch mild steel at a cutting speed that is greater than 100 inches per minute (ipm).

While the inlet passages and the outlet passages have been described as generally being multiple discrete round holes, other configurations are possible. For example, in some embodiments, a nozzle can include just one inlet passage and one outlet passage to deliver gas to and from the flow channel. Alternatively, in some cases, the inlet passage and/or the outlet passage can be in the form of one or more substantially annular (e.g., partially or fully annular) openings formed around the nozzle body.

Torch systems can additionally or alternatively include other types of consumable cooling systems, such as nozzle cooling systems or nozzle and shield cooling systems, arranged at one or more regions within the torch. For example, consumable cooling systems can include features formed in or on one or more consumables (e.g., a nozzle, shield, and/or a retaining cap for the nozzle or the shield) to receive and direct gas flow (e.g., high speed cooling gas flow) to increase cooling of one or more of the consumables and cutting performance of the torch.

Figure 3:
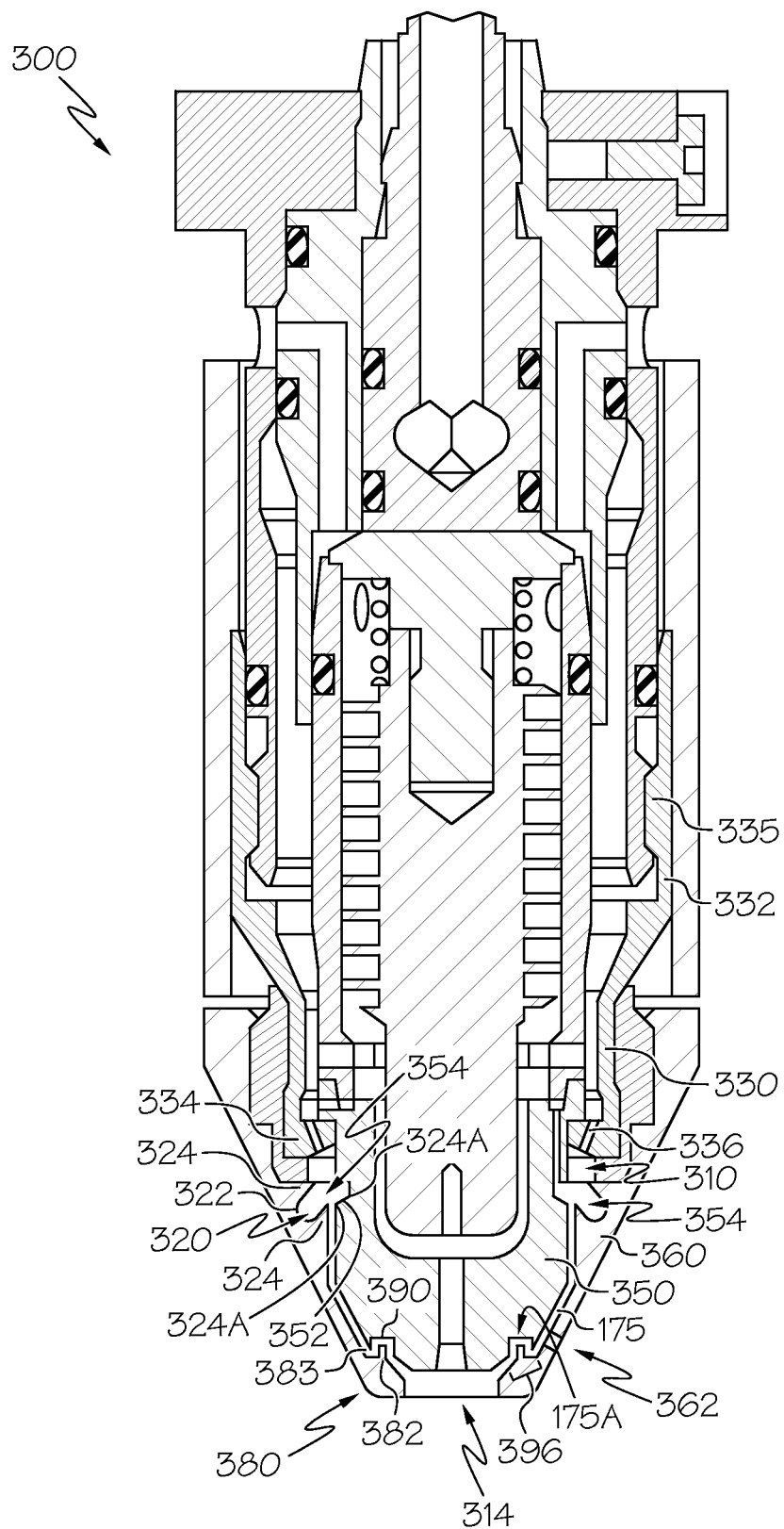
FIG. 3 is a cross sectional view of a plasma arc torch having a nozzle cooling system and a flow distribution system defined by features and elements formed along its nozzle and shield.

For example, referring to FIG. 3, in some aspects, a torch 300 can include a nozzle cooling system 310 and/or a nozzle and shield cooling system 320, which can each be implemented alone or in combination with one another to cool the components of the torch.

In some embodiments, to increase air cooling performance of the torch 300, the nozzle cooling system 310 can include a torch retaining cap 330 having features configured to direct cooling gas flow towards gas receiving surfaces of a nozzle 350. In particular, the retaining cap 330 is typically formed of a generally cylindrical body 332 having a securing flange 334 to retain the nozzle 350 within the torch. At an end typically opposite the securing flange 334, the retaining cap 330 typically includes a connection region (e.g., a threaded connection) 335 to secure the retaining cap 330 (and therefore also the nozzle 350) to the torch body.

As discussed in detail below, the securing flange 334 defines one or more gas holes or openings (e.g., gas supply ports) 336 that permit gas to flow through the retaining cap and on to the nozzle 350 for cooling. As illustrated, the gas supply ports 336 are typically arranged generally longitudinally with respect to the retaining cap and torch. Also, the gas supply ports 336 are positioned within the securing flange 334 generally substantially perpendicularly relative to a gas receiving surface (e.g., an impingement surface) 352 of the nozzle 350. For example, in some embodiments, the gas supply ports 336 are angled (e.g., arranged or directed inwardly towards the nozzle or longitudinal axis) relative to the longitudinal axis to direct cooling gas flow against the impingement surface 352.

The retaining cap typically includes multiple supply ports 336 (e.g., ten in the example shown in FIG. 3) arranged around the securing flange 334. In some embodiments, the supply ports 336 can be arranged substantially uniformly around the securing flange 334 to deliver gas substantially uniformly to the nozzle. For example, when ten supply ports are included, they can be separated from one another by about 36 degrees. In some cases, a more uniform distribution of supply ports 336 can create a more even flow of gas from the shield gas supply.

As mentioned above, the nozzle 350 includes an exterior feature (e.g., a recess) 354 defined along its outer surface to receive and redirect a cooling gas flow (e.g., the high velocity gas flow received from the retaining cap 330) to increase cooling capabilities. For example, as illustrated, the feature 354 can define the cooling gas receiving surface (e.g., the impingement surface) 352 that is positioned substantially perpendicularly relative to the longitudinal axes of the various gas supply ports 336. As discussed above, the substantially perpendicular positioning of the impingement surface 352 relative to the gas supply port(s) 336 helps to increase cooling capabilities at least in part by generating turbulent gas flows. In some cases, the gas flow through the supply ports 336 towards the impingement surface 352 is delivered at about 200 scfh (e.g., at speed of about 66986 feet per minute).

While the impingement surface 352 has been described and illustrated as generally being in the form of a surface defined within a recess, other configurations are possible. For example, in some embodiments, a nozzle can define an impingement surface that extends from its outer surface (e.g., along a flange) rather than being formed within a recess along the nozzle body. Additionally, in some cases, the impingement surface can be an outer surface of the nozzle that has a substantially similar shape and profile as the rest of the outer surface of the nozzle. That is, in some cases, the nozzle may be configured to receive a cooling flow along its outer surface without having additional, substantially modified features (e.g., impingement surface 352, feature 354, etc.) to receive the cooling gas flow.

While certain features or aspects of the nozzle 350 have been described with respect to the example in FIG. 3, it is noted that some other features of the nozzle 350 that are not inconsistent with or affected by the cooling system described above can be substantially similar to those of the of the nozzle 200 described above.

Alternatively or in combination with the nozzle cooling system 310, the torch can also include a nozzle-shield cooling system 320 to help cool a shield 380 disposed at the tip of the torch 300 to protect the nozzle from molten material (e.g., spatter) ejected from a workpiece. For example, in some embodiments, the nozzle-shield cooling system 320 includes a recess or profile (e.g., a mixing channel) 322 defined within the shield 360 and/or the nozzle 350 that is used to direct and circulate cooling gas flow between the shield 360 and the nozzle 350. As illustrated, the mixing channel 322 can be defined in close proximity to one or more components of the nozzle cooling system 310 (e.g., near the feature 354 or the impingement surface 352). In some cases, the mixing channel 322 is shaped having a substantially curved profile (e.g., a bulbous profile) to encourage a circulating flow therewithin.

In such a configuration, during use, cooling gas flow can be deflected away from the nozzle 350, for example, in part as a result of the angular arrangement of the impingement surface 352, and into the mixing channel 322 to be circulated. As noted above, the turbulent mixing flow generated by gas being deflected from the impingement surface 352 (or other flow deflecting surfaces of the nozzle of shield) into the mixing channel can increase the cooling capabilities of the nozzle-shield cooling system 320 and/or the nozzle cooling system 310.

The mixing channel 322 is typically partially formed by an edge (e.g., an inlet edge (e.g., a sharp inlet edge)) 324 defined along a surface of the shield 360 to capture a cooling gas flow and redirect the flow, for example from the impingement surface 352, into the mixing channel 322 for circulation and cooling. The edge 324 is typically formed to capture and re-direct the cooling gas flow flowing towards the torch tip into the mixing channel 322. For example, the edge 324 can include a sharp edge (e.g., defined by two surfaces positioned at an acute angle relative to one another) that is pointed away from the torch tip to intercept the cooling gas flow.

Alternatively or additionally, in some embodiments, the mixing channel 322 can be partially formed by an edge (e.g., an inlet edge (e.g., a sharp inlet edge)) 324A defined along a surface of the nozzle 350 (i.e., an edge between the impingement surface 352 and the vertical (longitudinal) surface extending from the impingement surface 352) to capture a cooling gas flow from the supply ports 336 and redirect the flow outwardly towards the mixing channel 322.

The mixing channel 322, and in some cases also the mixing channel edge 324, typically extend at least partially around nozzle. In some cases, the mixing channel 322 and edge 324 are defined within an interior surface of the shield and extend fully around an interior surface of the shield 360. In some cases, the mixing edge 324A is defined within an external surface of the nozzle 350 and extends fully around an external surface of the nozzle 350.

In some embodiments, the shield can include additional features (e.g., edges) to direct flow. For example, the shield can include multiple edges to direct flow within the mixing channel. These edges can be oriented upwardly (e.g., 324) or downwardly (not shown). Additionally or alternatively, the shield can include additional edges to direct flow into additional flow channels (e.g., additional cooling or flow-directing channels) formed within the shield.

While the cooling systems (e.g., the nozzle cooling system 310 and the nozzle-shield cooling system 320) described above have been described as primarily providing beneficial cooling properties, other advantageous performance capabilities can be obtained by their implementation. For example, in addition or as an alternative to the increased cooling capabilities discussed above, the features defined on the shield and/or the nozzle can increase gas flow properties so that a more uniform and evenly distributed flow of shield gas can be delivered to the torch tip. That is, in some cases, the features (e.g., the mixing channel or the impingement surface) can act as one or more flow distribution (e.g., flow buffering) chambers to smooth the flow transients. As discussed above, such evenly distributed flow can increase material processing performance by helping to create a more stable plasma arc.

Additionally, while certain features have been described above as being included on particular components, such as the mixing channel 322 being defined along an interior surface of the shield 360, other configurations are possible. For example, in some cases the mixing channel can be formed within an exterior surface of the nozzle. Alternatively, the mixing channel can be formed partially in both the nozzle and the shield, whereby the partial mixing channels direct flow between the two partial mixing channels to achieve the desired cooling and flow distribution properties.

Figure 4:
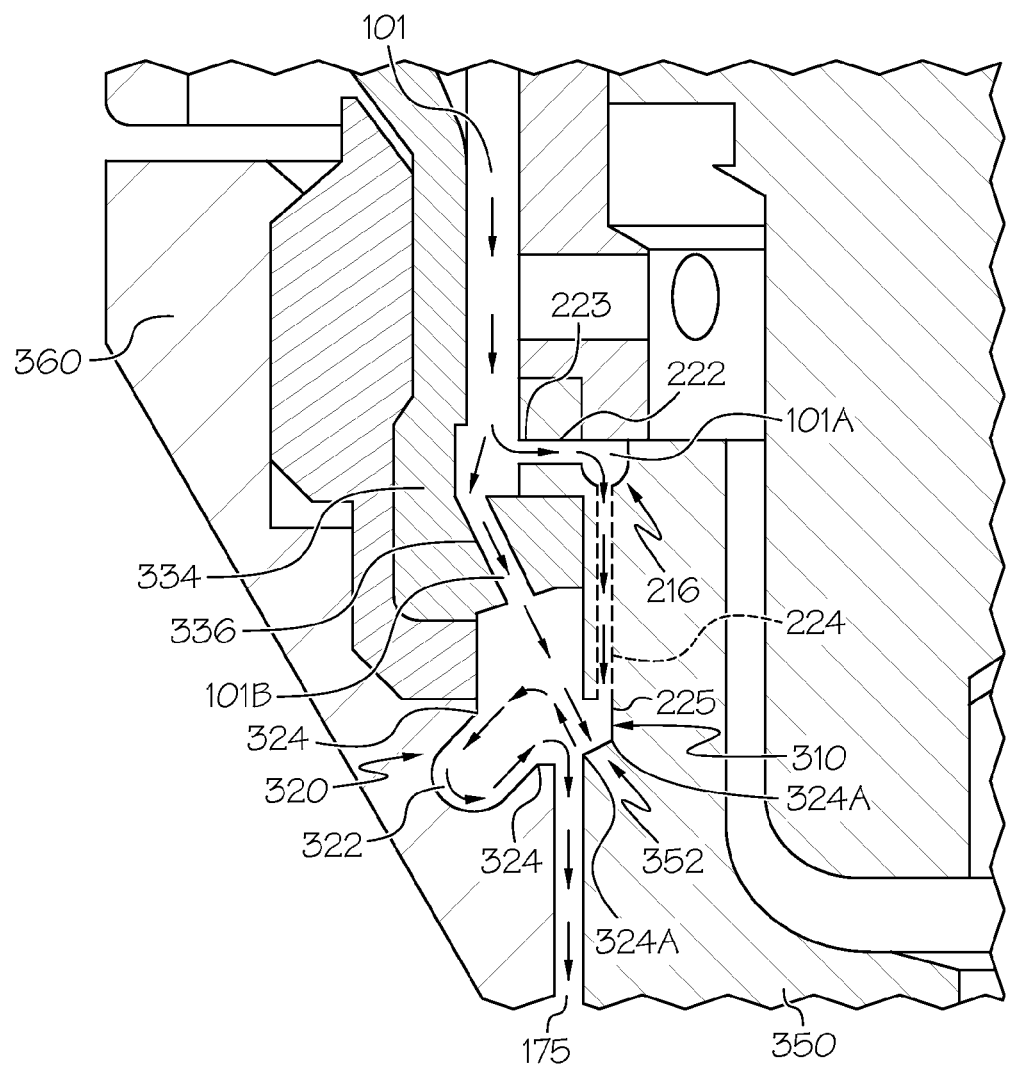
FIG. 4 is an enlarged cross sectional view of the nozzle cooling system of FIG. 3 illustrating an example cooling gas flow within and around the nozzle.

Referring to FIG. 4, in some aspects, a torch can include a nozzle defining the gas channel 216 as discussed above with respect to FIG. 2, as well as the nozzle cooling system 310 and/or the nozzle-shield cooling system 320 discussed above with respect to FIG. 3. In some cases, the shield gas provided by the torch body can be distributed and directed to one or more of the various channels and passages arranged to cool the shield and the nozzle. As illustrated and indicated using arrows in FIG. 4, a gas flow (e.g., a cooling/shield gas flow) 101 can first be delivered near the retaining cap securing flange. Upon reaching the securing flange 334 of the retaining cap and the exterior wall 220 of the nozzle, the gas flow can be divided and distributed between the nozzle inlet passage 222 and the gas port 336 formed through the securing flange. Alternatively, in embodiments where the torch does not include either of the nozzle with a cooling flow gas channel 216 or a nozzle cooling system 310 or nozzle-shield cooling system 320, the gas flow 101 can instead be directed only into one of the subsequent flow passages based on the various components present in the torch (e.g., directed only to the gas port 336 or only to the inlet passage 222).

A first flow portion 101A directed into the one or more inlet passages 222 through the inlet port 223, as discussed above, can be directed into the gas channel 216. The gas flow can be circulated within the gas channel 216 for mixing and cooling the nozzle and then subsequently to the one or more outlet passages 224 (shown in phantom) for distribution and cooling of the nozzle 350. The flow 101A can be expelled from the outlet passage 224, for example at the outlet port 225, so that it can continue between the nozzle 350 and the shield 360 to be expelled as shield gas between the shield and nozzle, and surrounding the plasma arc.

A second flow portion 101B, which flows into the one or more gas ports 336, can be directed (e.g., at high speed) towards the nozzle to cool the nozzle. As discussed above, the gas flow can be directed to the impingement surface 352 along the outer surface of the nozzle. The second flow portion 101B can strike the impingement surface 352 at a substantially perpendicular angle to create a turbulent flow behavior and increase cooling. Additionally or alternatively, the first flow portion 101A expelled from the outlet port 225 can also impinge upon the impingement surface 352 for cooling and to help generate turbulent flow.

After being deflected from the impingement surface 352, gas flow (e.g., the first flow portion 101A and/or the second flow portion 101B) can flow outwardly and into the mixing channel 322 to circulate and help cool the shield and to be mixed and distributed circumferentially within the mixing channel 322. As mentioned above, in some cases, the edge 324 can help to intercept gas flow and direct it into the mixing channel 322. After mixing and creating turbulent flow within the mixing channel 322, gas is directed into the annular passage (e.g., the shield gas flow passage) 175 arranged between the nozzle 350 and the shield 360 to be expelled from the torch tip.

The arrows illustrated to denote gas flows within the passages (e.g., the first flow portion 101A and the second flow portion 101B) are merely used to show simplified example flow patterns. It is noted that the actual gas flow pattern within the flow passages, in particular within the mixing channel, typically has turbulent flow and is highly erratic. Therefore, the actual flow within the passages may be different from the example arrows illustrated.

While FIG. 4 illustrates a torch having multiple consumable component cooling features and systems together in combination, other configurations are possible.

That is, for example, in some aspects, a torch may include the gas channel 216 disposed within the nozzle along with related passages and flow directing features that work in combination with the gas channel 216 to cool the nozzle. However, the torch may omit one or more of the other component cooling systems described herein (e.g., the nozzle cooling system 310 and/or the nozzle-shield cooling system 320). Similarly, in some aspects, a torch may include one or more of the component cooling systems described herein that utilize features and flow paths defined in the shield, nozzle, and or retaining cap (e.g., the nozzle cooling system 310 and/or the nozzle-shield cooling system 320), but the torch may include a nozzle that does not have the gas channel 216 and related flow passages.

In addition or alternatively to the various component cooling systems and aspects described above, torches described herein can include consumable components that include features or elements that can be implemented to provide a more uniform flow of shield gas emitted from the torch tip. Since the presence of vent holes in the shield (e.g., vent holes 362 illustrated in FIGS. 3 and 5) can cause shield gas flow non-uniformities, locating features for enhancing flow uniformity between the shield vent holes and the shield exit orifice can result in increases in gas flow uniformity about the plasma exiting the shield, thereby producing improved cutting performance and resulting in reduced wear of torch consumables.

For example, referring back to FIG. 3, the torch 300 can also include a shield gas flow distribution system 380, which can include one or more features of the nozzle 350 and the shield 360 that work in combination with one another to distribute flow about the substantially circumferential shield gas flow channel 175. For example, the flow distribution system 380 can define an alternating flow channel that directs or disrupts the flow of the shield gas in an alternating (e.g., zig-zag, S-shaped, or tortured flow path) manner to create a turbulent flow and distribute flow circumferentially around the nozzle. As discussed above, a more evenly distributed flow of the shield gas can be helpful to generate a more stable plasma arc for better cutting performance.

In particular, in some embodiments, the flow distribution system 380 can be formed by a flow directing feature 382 extending from the shield (e.g., from the interior surface of the shield) to alter (e.g., disturb, re-direct, or reverse) the flow of shield gas passing through the shield gas passage 175. The flow directing feature 382 can be configured to work in combination with a complementary flow receiving feature 390 defined within the outer surface of the nozzle to form an altered, reversed shield gas flow path 175A within a mixing region (e.g., a recombination region) 396 defined within the flow distribution system 380. Flow reversal of at least a portion of the shield gas passing through the shield gas flow distribution system 380 is desirable.

Figure 5:
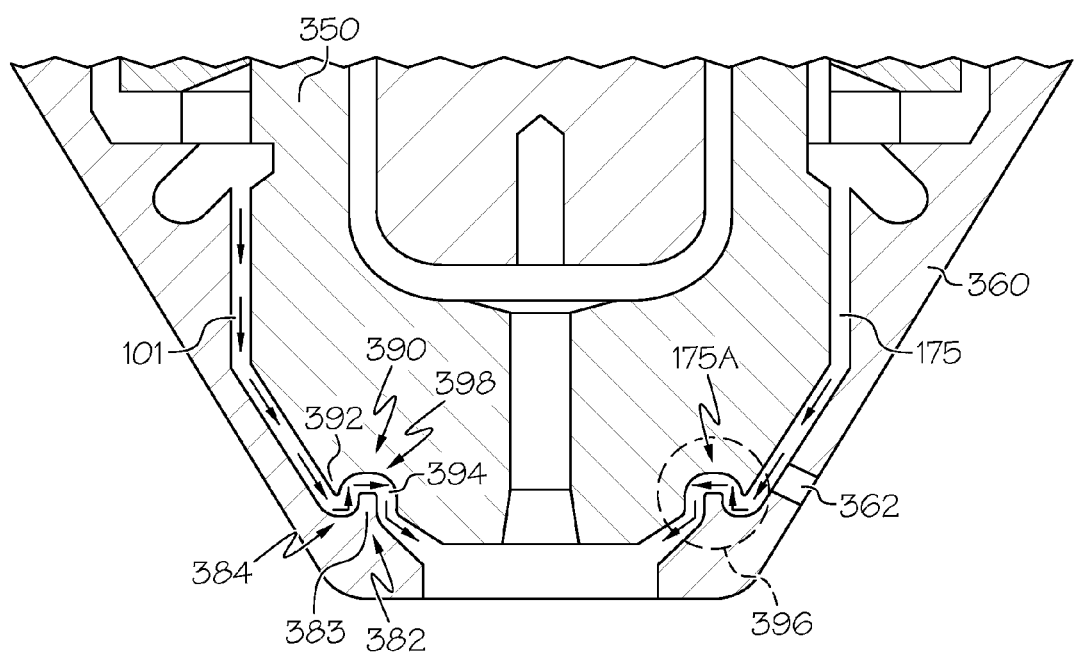
FIG. 5 is an enlarged cross sectional view of the flow distribution system of FIG. 3 illustrating features formed along the nozzle and shield to redirect and substantially uniformly distribute the shield gas flow annularly around the nozzle.

Referring to FIGS. 3 and 5, the flow directing feature 382 can include any of various physical elements that are structurally suitable to partially obstruct (e.g., direct, re-direct, reverse, or otherwise alter) the flow of the shield gas flowing through the shield gas channel 175. For example, the flow directing feature 382 can be in the form of a protuberance (e.g., a flange, a baffle, a projection, a sharp bump, a protrusion, or another suitable physical element) 383 extending away from the interior surface of the shield 360. In some embodiments, the flow directing feature 382 can form a tortured flow path. Typically, as illustrated in FIGS. 3 and 5, the flow directing feature 382 extends from the shield 360 in a direction that is inconsistent (e.g., opposing) the general flow of the shield gas flow channel 175 towards the torch tip. For example, in some embodiments, the protuberance 383 can extend towards a proximal end of the torch (e.g., away from the torch tip). That is, the protuberance 383 can be directed in the opposite direction that the shield gas and plasma gas generally travel during use.

For example, referring more particularly to FIG. 5, the flow directing feature can be positioned so that as gas flows through the shield gas flow channel and strikes the flow directing feature 382, the gas typically makes contact with an impingement surface 384 formed where the flow directing member (e.g., the protuberance) extends outwardly away from the interior surface of the shield. As a result of this configuration, the flow directing feature 382 (e.g., the protuberance 383) disturbs the flow of shield gas and temporarily directs it upwardly and into the nozzle (e.g., the flow receiving feature 390).

The various elements of the flow directing feature 382 (e.g., the protuberance 383 or the impingement surface 384) can each be formed continuously or in one or more segments substantially circumferentially around the shield 360. In some embodiments, the flow directing feature 382 may have a substantially uniform height about the shield.

Figure 5A:
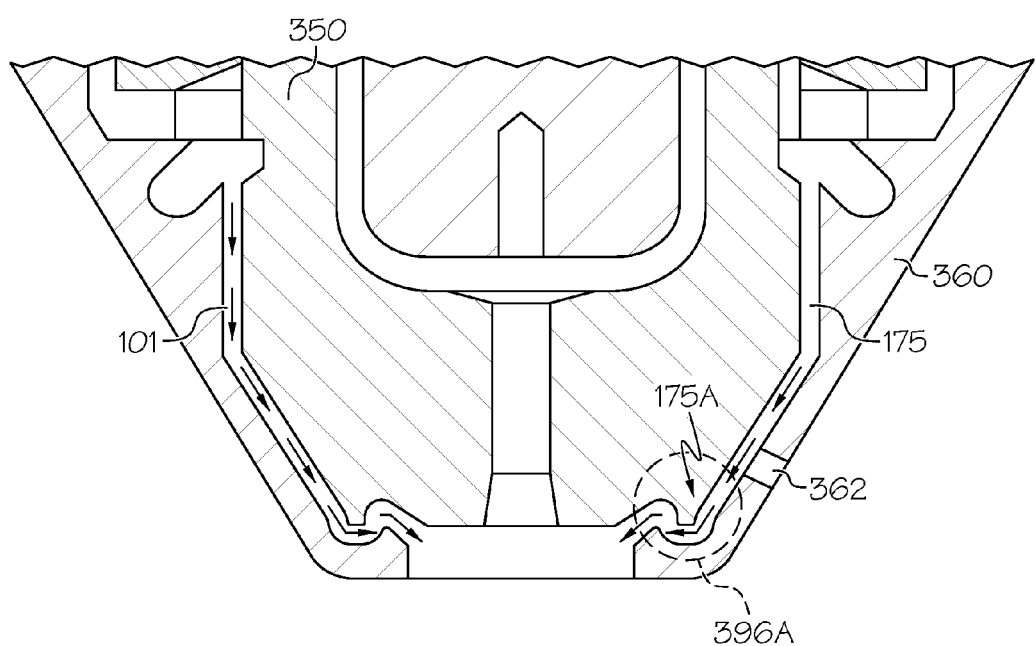
FIG. 5A is an enlarged cross sectional view of another example flow distribution system illustrating features formed along the nozzle and shield to redirect and substantially uniformly distribute the shield gas flow annularly around the nozzle.

The flow receiving feature 390 typically includes one or more elements that fit complementary with the elements of the flow directing feature 382 (e.g., the protuberance 383 and/or the impingement surface 384) to direct the flow of shield gas to the nozzle and shield and to evenly distribute shield gas evenly around the bore 314. As illustrated in FIG. 5, in some embodiments, the flow receiving feature 390 includes a portion (e.g., a flow feature, such as a ridge, a flange, a baffle, a projection, a sharp bump, a protrusion, or another suitable physical element) 392 that extends outwardly away from the exterior surface of the nozzle to direct shield gas flow. For example, the ridge 392 can direct shield gas flow outwardly towards the shield. In particular, the ridge 392 can be complementarily positioned to direct shield gas flow into the impingement surface 384 of the shield. While certain configurations have been described and illustrated, other configurations are possible. For example, as depicted in FIG. 5A, some or all of the features described as being disposed along the nozzle (e.g., the flow receiving feature 390) may be alternatively disposed along a surface of the shield and some or all of the features described as being disposed along the shield (e.g., the flow directing feature 382) can alternatively be disposed along a surface of the nozzle.

Additionally or alternatively, the nozzle 350 can also include a nozzle flow receiving feature (e.g., a recess or groove) 394 to receive and re-direct a flow of gas that is directed proximally away from the torch tip by the shield impingement surface 384 and the protuberance 383. In particular, the recess 394 can be formed within the outer surface of the nozzle and define a nozzle impingement surface 398 to receive and re-direct the flow of shield gas.

The various elements of the flow receiving feature 390 (e.g., the protuberance 392, the recess 394, or the impingement surface 398) can each be formed continuously or in one or more segments substantially circumferentially around the nozzle 350.

During use of the torch, shield gas flow 101 is typically directed towards the torch tip in the shield gas flow channel 175 formed annularly between the nozzle 350 and the shield 360. In some cases, the shield gas flow 101 flows inconsistently circumferentially around the annular shield gas flow channel 175, for example, as a result of the flow being provided through one or more discrete flow channels (e.g., the ports 336) formed around the nozzle 350. To help alleviate inconsistencies, flow 101 can be directed into the shield impingement surface 384 and the protuberance 383, which deflect and re-direct the flow upward (i.e., away from the shield bore 314) and into the nozzle recess 394 and the nozzle impingement surface 398. In some cases, the nozzle protuberance 392 helps to capture some or all of the flow that impinges the shield impingement surface 384 to help limit the shield gas flow 101 from inadvertently traveling upstream within the shield gas flow channel 175. Rather, the nozzle protuberance 392 can help to direct flow to continue downstream (e.g., into the nozzle recess 394) and towards the shield bore 314.

Directing the shield gas flow 101 upward into the recess 394 (e.g., and into the mixing region 396 defined therein) can have one or more effects on the flow. The features along the nozzle and the shield that define the mixing region 396 can also help to distribute the shield gas more evenly within the shield gas flow channel 175 circumferentially around the bore 314. For example, the flow 101 can impinge the shield impingement surface 384 and protuberance 383 and be directed upwardly, the flow 101 can fill the nozzle recess 394 and be distributed annularly (e.g., can flow circumferentially) therewithin. As the recess 394 and the mixing channel 396 fill with shield gas flow 101, the more evenly distributed flow can then be directed by the nozzle impingement surface 398 downstream and out of the shield gas flow channel 175 through the shield bore 314 to surround a plasma arc. In some cases, the shield gas flow exiting the mixing channel is substantially uniformly distributed annularly around the nozzle.

The flow distribution system 380 is typically arranged near the distal end (e.g., the tip of the torch) close to the shield's bore (e.g., exit orifice) 314 to distribute the gas flow around the shield to help create a more uniform flow of shield gas leaving the shield bore 314. To help limit the influence of the other flow features of the shield or the nozzle, the flow distribution system 380 is typically arranged closer to the shield bore 314 than most (e.g., all) of the other flow altering features. For example, in some embodiments, the flow distribution system 380 (i.e., and therefore the related features on the shield and the nozzle associated with the flow distribution system 380) is typically arranged between the shield bore 314 and shield vent ports (e.g., metering holes) 362 to limit inconsistent flow that could be caused by gas escaping the shield gas flow channel 175 through the vent ports 362. Additionally, in embodiments where the torch also includes a mixing channel 322, the mixing region 396 is typically arranged between the shield's bore (e.g., exit orifice) 314 and the mixing channel 322.

While the features described above with respect to FIG. 5 have primarily been described as providing flow distribution to create a more uniform flow, the features may also provide increased cooling capabilities. For example, gas flow into the recess feature on the outer surface of the nozzle, as directed by the flow feature extending from the interior surface of the shield, can cool the nozzle, at least in part as result of circulating, turbulent flow generated within the recess feature.

In other aspects, nozzles used within torches can be sized, proportioned, and configured to have increased cooling capabilities either alone or in combination with any of the cooling systems or techniques discussed herein. In particular, nozzles can be designed, proportioned, and constructed to have an increased tip mass to volume ratio relative to the rest of the nozzle. That is, the nozzle can have a higher concentration of mass located at its distal tip (e.g., surrounding or near the bore), which can help promote conductive cooling of the nozzle for air-cooled torch embodiments. In particular, increased material mass at the distal tip or the nozzle, especially increased material extending radially away from the longitudinal axis can provide greater heat transfer paths through which heat can travel outwardly within the nozzle and away from the torch tip. The additional heat conduction flow area is required to prevent premature failure of air-cooled torches for high current (e.g., greater than 100 Amp) torches, increase consumable or cutting life and to maintain high cut quality at high speed, which can be enabled based on the better cooling characteristics.

For example, in some embodiments, a nozzle can have a longitudinally shorter proximal end height, a wider nozzle tip (e.g., a larger end face), thicker plenum side walls, and/or have a longer bore (i.e., a thicker plenum floor) that can produce greater cooling effects by providing increased mass through which heat can travel for cooling.

Figure 6:
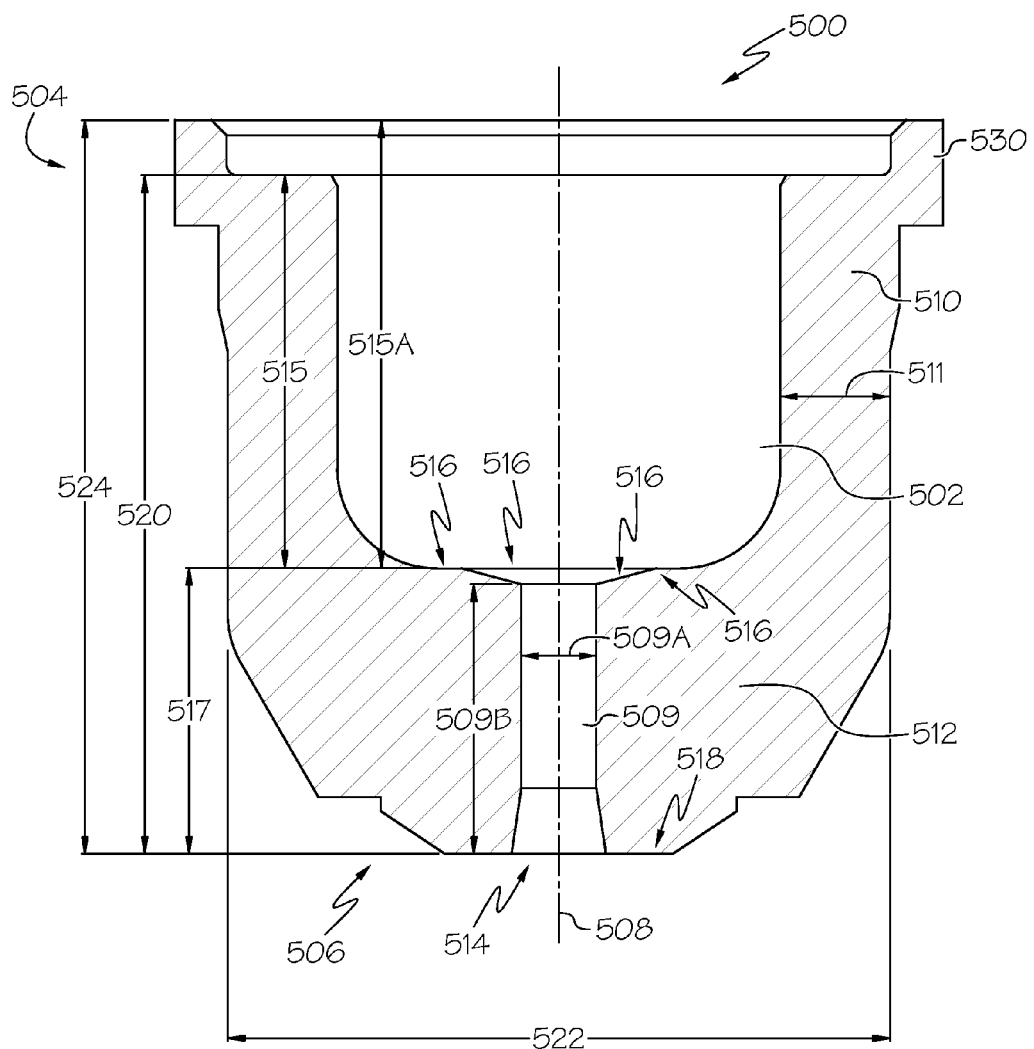
FIG. 6 is a cross sectional view of an example nozzle for a plasma arc torch having a wider end face and distal end region to distribute heat and increase nozzle cooling.

In some embodiments, referring to FIG. 6, a nozzle 500 for a gas-cooled plasma arc torch typically includes a body (e.g., a generally hollow cylindrical body) 502. In some embodiments, the body 502 is formed of a metal material, such as copper. The body 502 has a first, proximal end 504 and a second, distal end 506, and a longitudinal axis 508 that extends substantially centrally through the cylindrical body 502. The body 502 is typically formed of a generally annular cylindrical wall (e.g., a plenum side wall) 510 that extends upwardly from a base structure 512 defined at the second end 506. The plenum side wall 510 defines an opening to accommodate an electrode when assembled into a torch. The width (e.g., the radial width) of the plenum side wall is referred to herein as the plenum side wall thickness 511.

The base structure 512 typically defines a bore (e.g., a cylindrical hole or a conduit) 509 centrally formed between a plenum floor 516 and a nozzle end face 518 disposed along the distal end 506. In some embodiments, the plenum floor 516 is located along a surface or feature proximate where an electrode contacts the nozzle to start a plasma arc (e.g., a contact start region). The bore 509 typically has a width (e.g., diameter) 509A and a length (e.g., a conduit length) 509B, and extends through the end face 518 via an opening (e.g., a central nozzle exit orifice) 514. As illustrated, in some embodiments, the bore 509 can include a surface modification along one or more of its corners including a counterbore, a chamfer, a frusto-conical region and/or a fillet at each end of its length (e.g., at its proximal and/or distal end). In some cases, the bore 509 has a chamfer or a counter bore at each end. Additionally or alternatively, the width of the bore 509 can vary along its length or even have a non-uniform shape along its length.

The distance between the plenum floor 516 and the end face 518 is referred to herein as the plenum floor thickness (e.g., a distal portion length) 517. The bore length 509B typically corresponds (e.g., can be equal) to the plenum floor thickness 517. In some cases, surface modifications, such as counterbores, angled features, chamfers, or fillets can be included in the plenum floor thickness 517. The distance between the plenum floor 516 and the proximal end 504 is referred to herein as a proximal end length 515. During use, plasma gas can flow through the bore and be expelled from the nozzle at the exit orifice 514.

The proximal end 504 is typically formed and configured to mate with one or more features or components of the torch. For example, in some embodiments, the nozzle proximal end 504 can be configured to mate against a swirl ring arranged within the torch.

In some embodiments, the nozzle has a nozzle body length 520 that is defined by its nozzle portion (i.e., exclusive of a flange portion that may be included as illustrated in FIG. 6) and a nozzle width 522 in a direction that is perpendicular (e.g., transverse) to the longitudinal axis and length. That is, the nozzle length 520 can include the proximal end length 515 and the distal portion length 517, but not the length associate with additional flanges that may be arranged for mounting the nozzle (e.g., a nozzle body flange 530 discussed below).

The nozzle can also include the body flange 530 at the proximal end, which can be used for positioning the nozzle or for implementing various cooling features and techniques. In some embodiments, the proximal end length 515A includes the distance between the plenum floor 516 and the end of the nozzle including the flange 530. As such, an overall nozzle body length 524 can be defined by a distance from a proximal end of the nozzle body flange 530 to the end face 518. In some embodiments, the nozzle can be designed such that the overall nozzle body length 524 of the nozzle is greater than the nozzle body length 520. In some embodiments, the body flange (e.g., flange 530) can extend above the nozzle plenum. In some embodiment, the body flange (e.g., flange 530) can extend a small percentage (e.g., about 5 percent to about 40 percent) above the nozzle plenum. In some embodiments, the body flange (e.g., flange 530) can extend about 0.05 to about 0.5 inches above the nozzle plenum.

As discussed above, the nozzle can have certain dimensions and proportions that are designed and expected to produce increased cooling capabilities. For example, the nozzle body typically has a nozzle body length 520 that is greater than its nozzle body width 522 and where a ratio of the proximal end length 515A to the plenum floor thickness 517 is less than about 2 (e.g., less than about 1.4). In some embodiments, a ratio of a length of the second, proximal portion 504 (e.g., at least partially defined by the proximal end length 515A) to the conduit length 509B is less than about 2 (e.g., less than about 1.4). Such proportions are expected to permit greater amounts of heat to transfer through nozzle, for example, outwardly (e.g., away from the bore 509) and upwardly (e.g., away from its end face 518).

Other plasma torch nozzles, for example, nozzles previously manufactured by Hypertherm of Hanover, N.H. have been sized and proportioned such that their ratios of proximal end length to plenum floor thickness (or bore length) were greater than 2. For example, one such nozzle (i.e., a 40 Amp nozzle identified by part number 2-014) has a proximal end length to bore length ratio that is about 2.98. Similarly, another nozzle (i.e., a 0.059 nozzle identified by part number 3-007) has a proximal end length to bore length ratio that is about 2.44.

In some embodiments, a ratio of the length of the bore 509B to the nozzle body length 524 is greater than about 0.25 (e.g., greater than 0.30, greater than 0.32, or greater than 0.35). Nozzles having such proportions in which the length of the bore (e.g., 509B), and therefore in some cases the thickness of the distal portion length, is relatively large when compared to the nozzle body length (e.g., nozzle body length 520 or the nozzle body length 524) can have increased mass concentrated at the distal end, which can help to increase cooling. That is, the increased amount of material arranged at the distal end is expected to provide greater thermal conductivity through which heat can transfer away from the tip for cooling.

In some embodiments, a nozzle for which a ratio of the conduit length (e.g., bore length) 509B to nozzle body length 524 is greater than about 0.25 (e.g., greater than 0.30, greater than 0.32, or greater than 0.35) can also be configured to permit operation at a current to nozzle body length 524 ratio of greater than about 170 amps per inch.

Other plasma torch nozzles, for example, nozzles previously manufactured by Hypertherm of Hanover, N.H. have been sized and proportioned such that their ratios of conduit (or bore) length to nozzle body length were at the lower end of the range. For example, one such nozzle (i.e., the 40 Amp nozzle identified by part number 2-014, referenced above) has a conduit (or bore) length to nozzle body length ratio that is about 0.25. Similarly, another nozzle (i.e., the 0.059 nozzle identified by part number 3-007, referenced above) has a conduit (or bore) length to nozzle body length ratio that is about 0.29.

The nozzle (e.g., the nozzle 500) can include one or more of the features or elements discussed above with respect to FIGS. 2-5 that can be implemented to further increase cooling capabilities of the nozzle. For example, in some embodiments, the flange 530 can include a cooling flow channel (e.g., substantially similar to the gas channel 216 described above). Additionally, the nozzle (e.g., the flange 530 and/or the plenum side wall 510) can include the inlet and outlet passages that to provide gas flow to and from the flow channel as described with respect to FIG. 2.

In some embodiments, a side wall thickness of the plenum (e.g., the plenum side wall thickness 511) is between an inside diameter of the plenum and an outer diameter of the plenum, and the ratio of the plenum side wall thickness to the width of the nozzle body (e.g., the nozzle body width 522) is about 0.15 to about 0.19.

While the nozzle 500 has been illustrated and described as having a certain design and features, other configurations are possible. That is, the nozzle can include one or more of the flow features and elements as described above with respect to FIGS. 2-5 without departing from basic dimensions and proportions described herein with respect to FIG. 6 as providing increased cooling properties While certain embodiments and configurations of systems and methods have been described herein, other configurations are possible. That is, the various cooling and flow distribution systems and devices described including the gas channel 216 (and related passages and surfaces), the nozzle cooling system 310, the nozzle-shield cooling system 320, the flow distribution system 380, and the proportioned nozzle 500 having dimensions as described with respect to the example illustrated in FIG. 6 can be implemented within a torch system in any combination of one or more of these systems and features. In some examples, a torch system may include the gas channel 216 (and related passages and surfaces), the nozzle cooling system 310, the nozzle-shield cooling system 320, the flow distribution system 380, and/or a nozzle having the proportioned dimensions of FIG. 6.

While various embodiments have been described herein, it should be understood that they have been presented and described by way of example only, and do not limit the claims presented herewith to any particular configurations or structural components. Thus, the breadth and scope of a preferred embodiment should not be limited by any of the above-described exemplary structures or embodiments, but should be defined only in accordance with the following claims and their equivalents. Other embodiments are within the scope of the following claims.

What is claimed:

1. A nozzle cooling system for a plasma arc torch comprising:
a nozzle having a body with a first end and a second end that define a longitudinal axis, a plenum region substantially formed within the body, the plenum region extending from the first end of the body and configured to receive a plasma gas flow, an exit orifice located at the second end of the body and oriented substantially coaxially with the longitudinal axis, the exit orifice fluidly connected to the plenum region, and a feature on an outer surface of the body configured to increase cooling by receiving a cooling gas flow flowing at high velocity generally in a direction of the longitudinal axis along a length of the body, an impingement surface of the feature configured to receive the cooling gas flow at a substantially perpendicular direction relative to the impingement surface and to redirect the cooling gas flow to promote cooling and uniform shield flow; and
a nozzle retaining cap comprising a generally cylindrical body and a securing flange, the securing flange of the retaining cap including a plurality of shield gas supply ports angled generally along the longitudinal axis of the nozzle at an angle that is substantially perpendicular to the impingement surface of the feature of the nozzle.

2. The nozzle cooling system of claim 1 wherein the nozzle retaining cap comprises about 10 shield gas supply ports.

3. A nozzle-shield cooling system comprising:
a nozzle having a body with a first end and a second end that define a longitudinal axis; a plenum region substantially formed within the body, the plenum region extending from the first end of the body and configured to receive a plasma gas flow; an exit orifice located at the second end of the body and oriented substantially coaxially with the longitudinal axis, the exit orifice fluidly connected to the plenum region; and a feature on an outer surface of the body configured to increase cooling by receiving a cooling gas flow flowing at high velocity generally in a direction of the longitudinal axis along a length of the body, an impingement surface of the feature configured to receive the cooling gas flow at a substantially perpendicular direction relative to the impingement surface and to redirect the cooling gas flow to promote cooling and uniform shield flow; and
a shield for the plasma arc torch comprising a generally conical body and an end face having a shield exit orifice, an interior surface of the shield comprising a mixing chamber at a location corresponding to the impingement feature of the nozzle when assembled together, the mixing chamber comprising an inlet edge positioned to direct the cooling gas from the impingement feature into the mixing chamber.

4. The nozzle-shield cooling system of claim 3, wherein the mixing chamber and inlet edge extend about a circumference of the interior surface of the shield.

5. The nozzle-shield cooling system of claim 3 wherein a profile of the inlet edge defines an acute angle.

6. The nozzle-shield cooling system of claim 3 wherein the inlet edge extends toward the first end of the nozzle body.

7. The nozzle-shield cooling system of claim 3 wherein the inlet edge extends toward the second end of the nozzle body.

8. The nozzle-shield cooling system of claim 3 wherein the shield comprises at least two inlet edge features.

9. The nozzle-shield cooling system of claim 3 wherein the mixing chamber has a bulbous cross section.

10. The nozzle-shield cooling system of claim 3 wherein the mixing chamber is of sufficient volume to increase a flow uniformity of the cooling gas by performing as a buffering chamber to reduce cooling gas flow transients.

\* \* \* \* \*